(12) United States Patent
Prahalad (10) Patent No.: US 8,316,442 B2
(45) Date of Patent: Nov. 20, 2012

(54) PREVENTING SECURE DATA FROM LEAVING THE NETWORK PERIMETER

(75) Inventor: Prashanth Prahalad, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 12/014,099

(22) Filed: Jan. 15, 2008

(65) Prior Publication Data

US 2009/0183257 A1    Jul. 16, 2009

(51) Int. Cl.
*G06F 11/00* (2006.01)

(52) U.S. Cl. ............ 726/22; 713/165; 713/189; 726/12; 726/26

(58) Field of Classification Search .................. None
See application file for complete search history.

(56) References Cited

U.S. PATENT DOCUMENTS

| | | | |
|---|---|---|---|
| 5,673,316 A | 9/1997 | Auerbach et al. | |
| 6,049,612 A | 4/2000 | Fielder et al. | |
| 6,339,830 B1 | 1/2002 | See et al. | |
| 6,389,532 B1 | 5/2002 | Gupta et al. | |
| 7,266,121 B2 | 9/2007 | Raisanen | |
| 7,788,235 B1 * | 8/2010 | Yeo ............................. | 707/687 |
| 2002/0031094 A1 | 3/2002 | Nitta | |
| 2003/0115485 A1 | 6/2003 | Milliken | |
| 2004/0073617 A1 * | 4/2004 | Milliken et al. ............... | 709/206 |
| 2004/0172551 A1 | 9/2004 | Fielding et al. | |
| 2005/0025291 A1 * | 2/2005 | Peled et al. ................ | 379/88.13 |
| 2005/0044395 A1 | 2/2005 | Staring et al. | |
| 2005/0108518 A1 * | 5/2005 | Pandya ......................... | 713/151 |
| 2005/0138353 A1 * | 6/2005 | Spies et al. ..................... | 713/153 |
| 2005/0234909 A1 | 10/2005 | Bade et al. | |
| 2006/0005247 A1 * | 1/2006 | Zhang et al. ...................... | 726/26 |
| 2006/0036693 A1 | 2/2006 | Hulten et al. | |
| 2006/0195449 A1 | 8/2006 | Hunter et al. | |
| 2006/0209843 A1 | 9/2006 | Zhang et al. | |
| 2007/0245137 A1 | 10/2007 | Bhagat et al. | |
| 2009/0064326 A1 | 3/2009 | Goldstein | |

FOREIGN PATENT DOCUMENTS

CN          1344082 A       4/2002

(Continued)

OTHER PUBLICATIONS

Anane, et al., "A Distributed Scheme for Secure Data Access", Date: 2006, pp. 1-5.

(Continued)

*Primary Examiner* — Shewaye Gelagay
(74) *Attorney, Agent, or Firm* — Mayer & Williams PC (57) ABSTRACT

Secure data is prevented from leaving the perimeter of a network such as an enterprise network or corporate network ("corpnet") by an arrangement in which a hash of the secure data is periodically computed, and the hashes are pushed out to an edge device on the network such as a firewall where they are stored for later access. The edge device is configured so that it has access to all traffic that flows between the enterprise network and an external network, such as the Internet, that is located outside the enterprise network perimeter. Whenever a user attempts to send data to the external network, a process running on the edge device computes a hash for the outbound data and compares it against the stored hashes associated with the secure data. If a match is made between the hash for the outbound data and a stored hash for secure data, then the edge device blocks the outbound data from leaving the network perimeter.

18 Claims, 5 Drawing Sheets

FOREIGN PATENT DOCUMENTS

| | | |
|---|---|---|
| CN | 1716294 A | 1/2006 |
| WO | 2006039967 A1 | 4/2006 |

OTHER PUBLICATIONS

Anderson, et al., "Preventing Internet Denial-of-Service with Capabilities", pp. 1-6.

Schneier, et al., "Secure Audit Logs to Support Computer Forensics", pp. 1-12.

International Search Report and Written Opinion Received for PCT Application No. PCT/US2008/088482, mailed on Jul. 20, 2009, 10 pages.

* cited by examiner

PREVENTING SECURE DATA FROM LEAVING THE NETWORK PERIMETER

BACKGROUND

In an enterprise computing environment, for example, an office of a business, a number of personal computers, workstations, servers and the like, along with other devices such as mass storage subsystems, internal network interfaces, and external network interfaces, are typically interconnected to provide an integrated environment in which information may be generated, sent to and accessed from external sources, and shared among various users. Commonly, users perform a variety of operations including order receipt, manufacturing, shipping, billing, inventory control, document preparation and management, e-mail, web browsing, and other operations in which creation, access, and sharing of data is beneficial.

Currently, security is typically provided for an enterprise using a variety of different security products, and in particular including hardware and software solutions that operate at the perimeter, or "edge" of the enterprise network. These solutions commonly include firewalls, proxy servers, gateways, and the like which monitor traffic moving between the enterprise network and external networks such as the Internet.

Current edge devices typically scan and inspect incoming traffic for malware (i.e., malicious software such as viruses, worms, trojans, rootkits, etc.) to thereby function to provide a zone of security around the enterprise. They can prevent users, for example, from downloading malware from the Internet or receiving malware in incoming e-mail. Sensitive or confidential data inside the enterprise (referred to collectively as "secure data") can be protected by employing digital rights management ("DRM") methodologies like digital signatures and watermarks that enable edge devices to block the data from being inappropriately sent outside the network perimeter.

While performing satisfactorily in many applications, these current security methodologies do not typically enable legacy secure data to be protected. In addition, such methodologies can be readily circumvented by a malicious user inside the enterprise who has the correct permissions to send secure data outside the network perimeter.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Secure data is prevented from leaving the perimeter of a network such as an enterprise network or corporate network ("corpnet") by an arrangement in which a hash of the secure data is periodically computed, and the hashes are pushed out to an edge device on the network such as a firewall where they are stored for later access. The edge device is configured so that it has access to all traffic that flows between the enterprise network and an external network, such as the Internet, that is located outside the enterprise network perimeter. Whenever a user attempts to send data to the external network, a process running on the edge device computes a hash for the outbound data and compares it against the stored hashes associated with the secure data. If a match is made between the hash for the outbound data and a stored hash for secure data, then the edge device blocks the outbound data from leaving the network perimeter.

In various illustrative examples, an administrator management function is provided by which a network administrator may designate which data in the enterprise is "secure" and thus subject to hashing and being blocked from leaving the network perimeter. The administrator may optionally configure the secure data management, for example, by configuring the hashing algorithm applied and other secure data management parameters. The administrator can also receive notifications of attempts to send secure data outside the network, and the identities of the host machines or users making such attempts.

A client-side agent running on host machines (e.g., desktop and laptop computers inside the perimeter of an enterprise) is configured to track changes made locally to any secure data downloaded from the enterprise network. The client-side process computes a hash for the secure data, (if the data is modified by a user on the local host), and pushes the hash out to the edge device. The client-side agent enables the stored hashes to remain current and to accurately represent all the secure data in the enterprise even as the secure data changes through user interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements in the drawings are not drawn to scale unless otherwise indicated.

DETAILED DESCRIPTION

Figure 1:
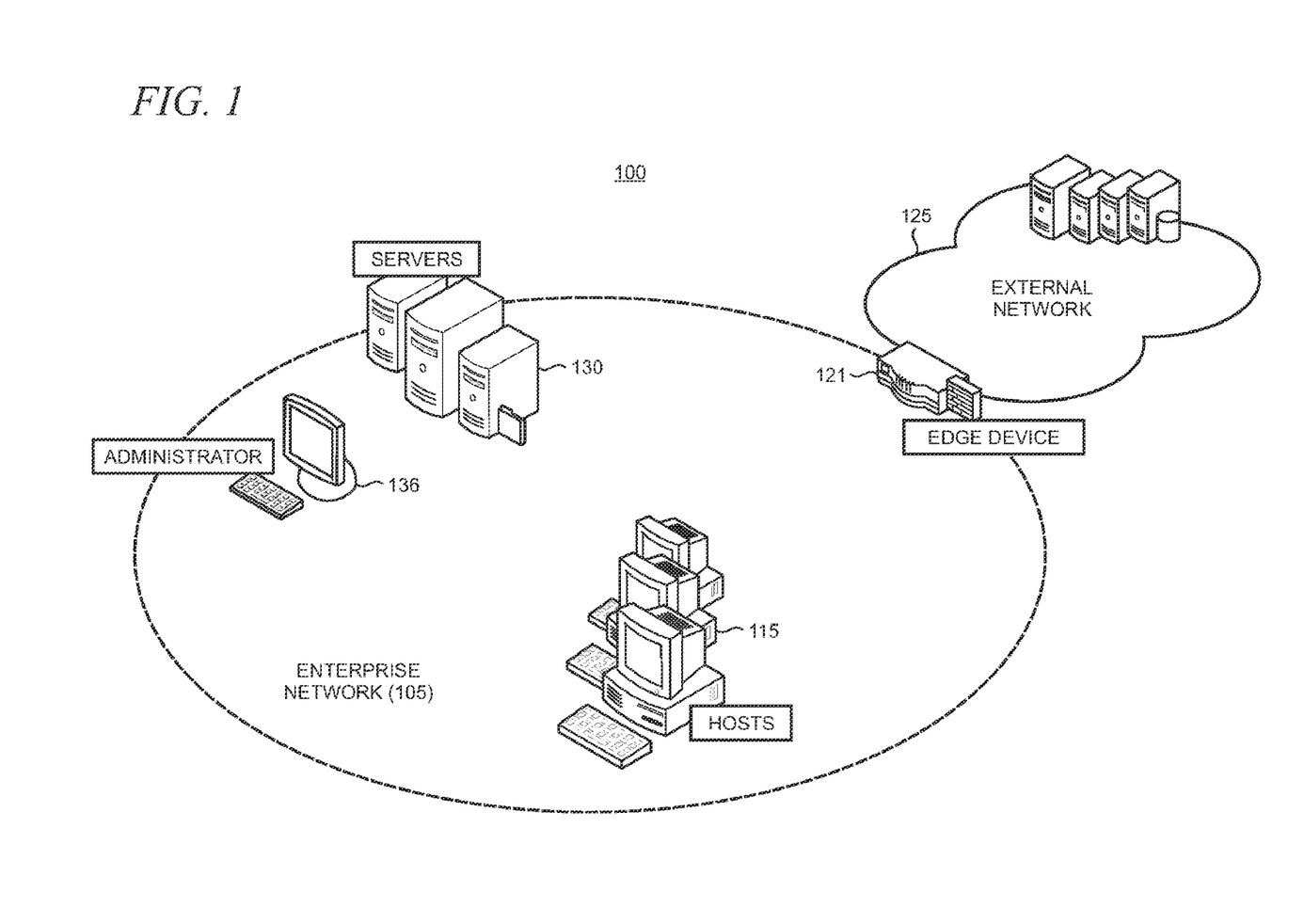
FIG. 1 shows an illustrative enterprise network environment in which the present arrangement for preventing secure data from leaving the network perimeter may be implemented.

FIG. 1 shows an illustrative enterprise network environment 100 in which the present arrangement for preventing secure data from leaving the network perimeter may be implemented. An enterprise, such as a business, company, or other organization uses an internal enterprise network 105 over which a variety of computers or workstations (collectively called "hosts" and identified by reference numeral 115) are arranged to communicate. An edge device 121 such as a firewall, gateway, proxy server, switch or router is located at the perimeter (indicated by the dashed line in FIG. 1) of the enterprise network 105. The edge device 121 typically couples the enterprise network 105 to an external network such as a public network or the Internet 125, as shown, which includes a number of remote servers which can host a variety of applications and data such as websites. In addition, the edge device 121 is configured so that is has access to all traffic that flows, both inbound and outbound, between the enterprise network 105 and the external network 125.

In this example, the edge device 121 is arranged as a Microsoft Internet Security and Acceleration ("ISA") server that is modified to provide the additional functionality that is described below in the text accompanying FIG. 4. ISA servers integrate network edge security features with enhanced network performance through features such as caching, HTTP (HyperText Transfer Protocol) compression, and quality of service ("QoS") policy enforcement.

As shown, a number of servers 130 are operative in the environment 100 and coupled to the enterprise network 105. The servers 130 here are representative of any of a variety of resources that are commonly utilized in an enterprise including, for example, application and database servers, file servers, line-of-business ("LOB") servers (supporting e-mail, for example), content and collaborative management servers, and the like.

An administrator console 136 ("admin console") is also supported in the environment 100. The admin console 136 enables configuration and management of the enterprise network 105 such as creating and maintaining user privileges and permissions, monitoring network operations and resources, generating reports, setting policies for security and auditing, and the like. An existing commercially available example of an admin console is Microsoft Operation Manager ("MOM") which could be modified to include the additional functionality that is described below.

Figure 2:
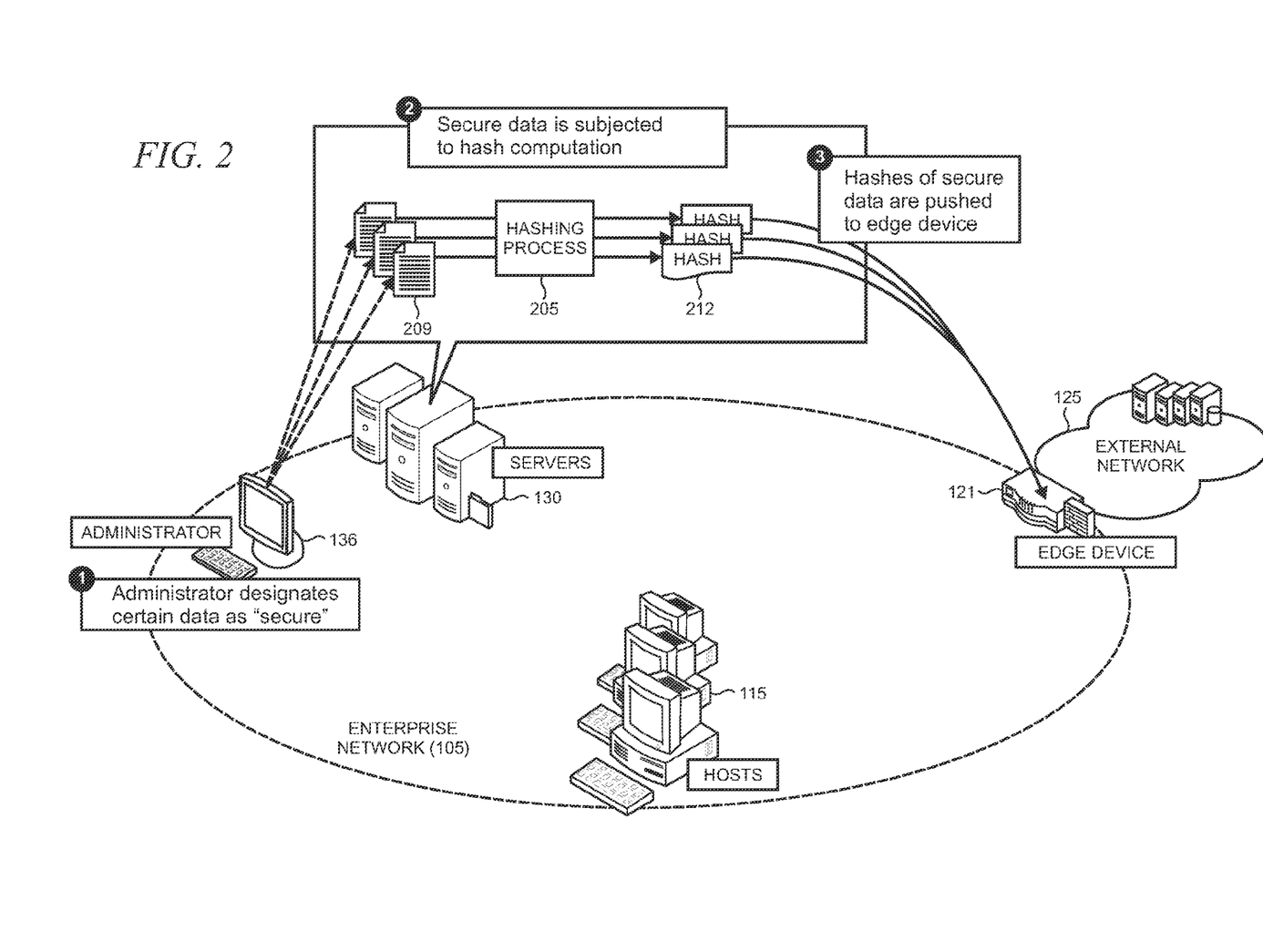
FIG. 2 shows an illustrative activity flow by which data is designated as "secure" and hashes for the secure data are computed and pushed to an edge device and stored.

FIG. 2 shows an illustrative activity flow by which an administrator, or other authorized user, interacting with the admin console 136 designates data that exists in the enterprise 100 as secure, and hashes for the secure data are computed and pushed to the edge device 121 and stored for later access. Typically, secure data will comprise data that has a proprietary, confidential, or sensitive nature that if sent outside the perimeter of the network 105, except under strictly controlled conditions, would pose some risk or jeopardy to the enterprise, or violate obligations or policies to keep the data inside the network, whether such obligations are legal, contractual, or are imposed as a matter of the normally accepted course of action for the enterprise. While the criteria used in designating data as secure can be expected to vary from implementation to implementation, in most all cases, secure data is subject to restrictions in being sent outside the enterprise network perimeter. The term "data" as used here can apply to most any type of information or object in the environment 100, but would typically include folders, files, and documents in most enterprise settings, which can use different formats and file extensions (e.g., .doc, .txt, etc.).

The activity flow begins at step (1) in FIG. 2 where the administrator designates or tags certain data in the environment 100 as secure according to some criteria that will depend on the circumstances of a particular implementation. In this example, the designation is provided by the administrator who is assumed to have the necessary authorization to perform such tasks. However, in other implementations, it may be desirable to enable other users with the permissions necessary to designate data as secure in some cases.

At step (2), a hashing process 205 for computing a hash 209 of the secure data (i.e., the data designated as secure by the administrator) is periodically run. The hashing process can be implemented using methods provided, for example, by a library class or API (application programming interface) that is incorporated into application or operating system software that runs on one or more of the servers 130.

Alternatively, the hashing process 205 at step (2) can be implemented as a service that is provided by an application, operating system, functionality, or component that runs externally to the servers 130, for example, on a standalone platform that is operated on the enterprise's premises, or is provided as a software service from an external network such as the Internet.

The hashing process 205 at step (2) can use one of a variety of known hashing algorithms, depending on the requirements of a given implementation. These hashing algorithms include, for example, LM (LanManager), MD4, MD5, CRC16, CRC32 (cyclic redundancy check), SHA-0/1, 2, etc. (Secure Hash Algorithm), Tiger, RIPEMD, and the like. While the hashing algorithms vary by length of the hash produced and other factors, they essentially all operate to take the data that is input into the algorithm and reduce it to a shorter and unique identifier called a "hash." If the input data to the hashing algorithm changes in even a slight way, the resulting hash can be drastically different. As a result, the hash works to identify the source data as kind of a digital signature in a compact form.

In some applications, the particular hashing algorithm utilized may be selected by the administrator using the admin console 136. This feature enables the administrator to specify parameters to fine tune or optimize processes according to the available resources, or select a particular balance between the strength of the hash and the processing resources needed to compute it. Other processing parameters that may be arranged to be selectable by the administrator include when and how the hashing algorithm is applied to the data in the environment 100 (e.g., on-demand, in batches, when resources are available, etc.).

The admin console 136 may be further configured to monitor and generate reports and audit logs pertaining to activity involving secure data in the environment 100. For example, the admin console 136 may track the number and identity of secure data, who accesses the secure data, and when they access it. Notifications as to actions taken by the hosts 115 and edge device 121 may also be received at the admin console, as described in more detail below.

At step (3) in FIG. 2, the computed hashes 212 are pushed out to the edge device 121 over the enterprise network 105. In this example, they are stored by the edge device 121 and accessed when the edge device 121 scans outbound traffic from the enterprise network 105, as described below. In alternative configurations, the hashes 205 can be pushed to a store (i.e., repository) that is separate from the edge device 121 but still operatively coupled to it. In many implementations, the hashes 205 will be stored on a persistent basis using non-volatile memory such as memory provided by a hard disk drive.

As the data that exists in the enterprise network 105 is generally dynamic where data is continuously created, deleted, and modified, hashes for the secure data are typically frequently generated and pushed out to the edge device 121. This enables the edge device 121 to stay updated with the latest information pertaining to secure data in the enterprise.

Figure 3:
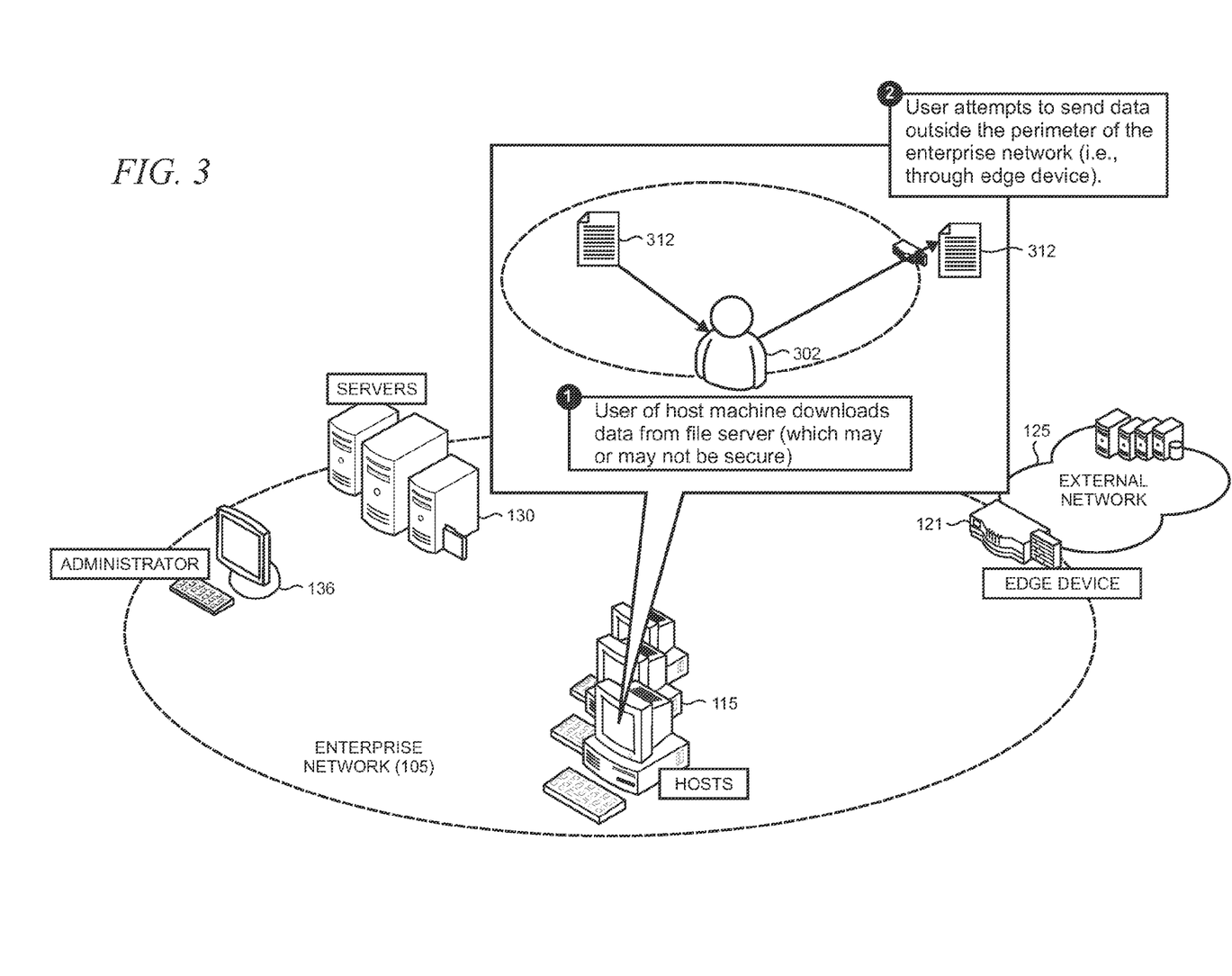
FIG. 3 shows an illustrative use scenario in which a user of a host machine downloads data and attempts to send it outside the perimeter of the enterprise network through the edge device.

FIG. 3 shows an illustrative use scenario to which the present arrangement for preventing secure data from leaving the network perimeter may be applied. It is noted that FIG. 3 shows a general scenario that has applicability to different use cases. Thus, in some cases the user 302 may be working with secure data and in other cases regular, non-secure data.

At step (1) in this use scenario, the user 302 downloads data 312 to the user's local host machine 115. At step (2), the user 302 attempts to send the data outside of the perimeter of the enterprise network 105, for example, by attaching a file to an e-mail that is addressed to an external domain on the Internet (i.e., external network 125) or by uploading data via FTP (File Transfer Protocol) to an external FTP site or server.

As the edge device 121 functions as a gateway to the external network 125, it is arranged here to scan all outbound traffic from the enterprise network 105 to prevent secure data from leaving the network perimeter. An illustrative activity flow for implementing this functionality is shown in FIG. 4. At step (1), a hashing process 405 running on the edge device 121 computes a hash 409 for each piece of outbound data 312 that the user 302 (FIG. 3) working at a host 115 is attempting to send outside. This hashing process 405 is similar to the process 205 shown in FIG. 2 and described in the accompanying text. That is, the process may be implemented using methods provided by a library class or API or is otherwise incorporated into a functionality, component, or service provided by the operating system or application running on the edge device 121.

At step (2), the computed hash 409 for the outbound data from the host 115 is compared against the stored hashes 422 associated with secure data that were computed as shown in FIG. 2 and described in the accompanying text. At step (3), if the computed hash 409 is found to match one of the stored hashes 422, then the outbound data 312 from the host 115 comprises secure data (i.e., data previously designated secure by the administrator) and will be blocked from leaving the perimeter of the enterprise network 105. If no matching hash is found among the stored hashes 422, then the outbound data 312 comprises non-secure data, and will be allowed to leave the enterprise network perimeter.

When a match is found, a notification can be sent to the admin console 136 to inform the network administrator that there was an attempt to send secure data outside the network, and that the attempt was blocked. The notification may also be configured to include the identity of a host machine or user making the attempt. This can be helpful information to the administrator in managing the enterprise network 105 and users. For example, the incident could indicate that the user 302 is unaware of enterprise policies regarding the handling of sensitive and proprietary data and needs more training. The user 302 could have simply made a mistake in attempting to send out the secure data.

Alternatively, it may be possible that the user 302 is actually a malicious user or that a legitimate user's identity has been assumed by a hacker, and the malicious user or hacker is intentionally seeking to move data outside of the network 105 in violation of policy. The incident could also indicate the possibility that a machine or other IT asset in the enterprise has been compromised which is manifested by the attempt to send out the secure data.

Figure 4:
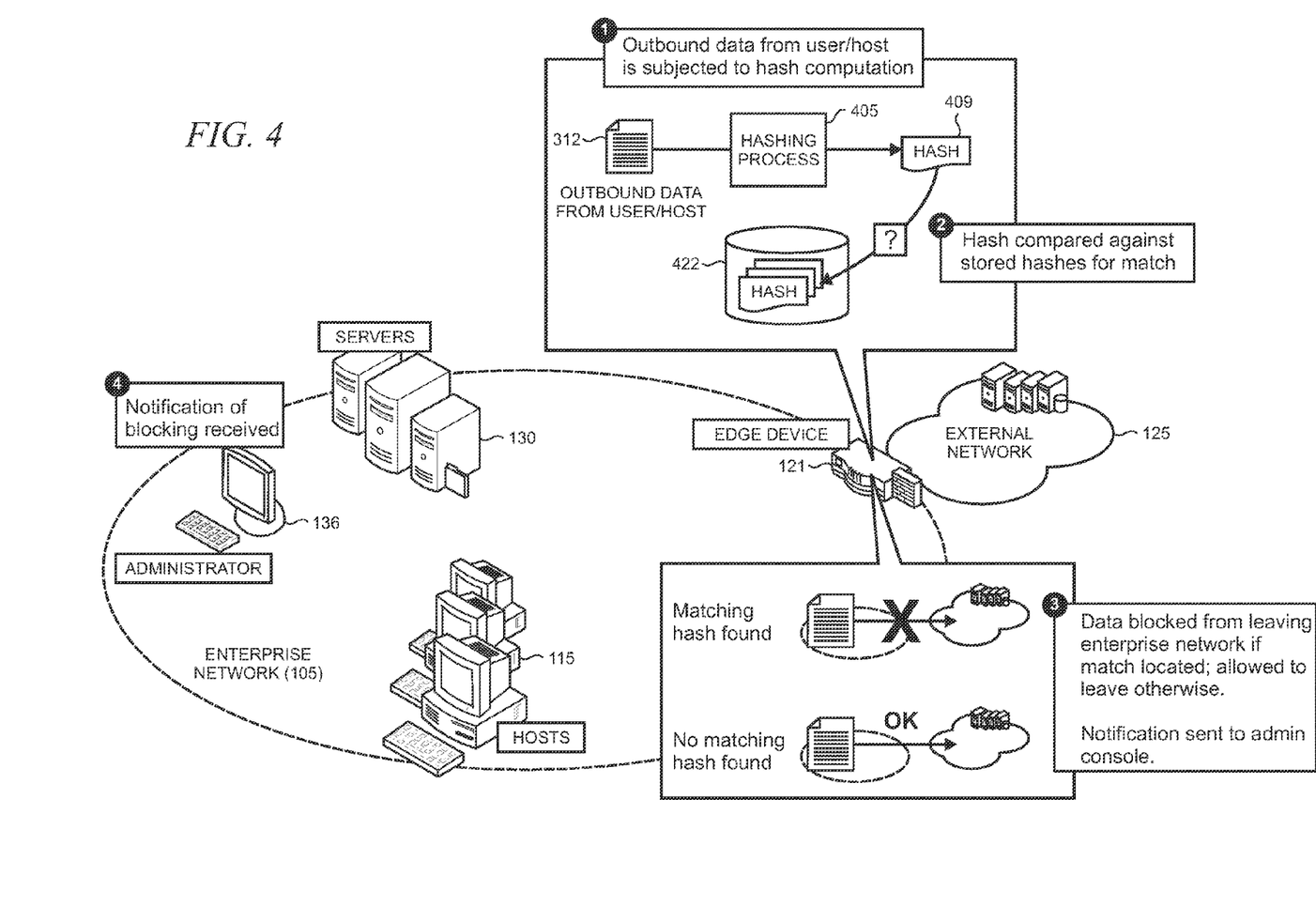
FIG. 4 shows an illustrative activity flow in which an edge device performs a hash computation on outbound data from the user, compares the resulting hash against the stored hashes associated with the secure data, and blocks the outbound data from the user if a match is found.

At step (4) in FIG. 4, the notification that the edge device 121 blocked the outbound secure data is received by the admin console 136. The notification can be logged for auditing purposes, for example, or be raised as an alert to the network administrator. The admin console 136 may also be configured to provide the administrator with the ability to manually override the blocking in some implementations and allow the outbound data to leave the network perimeter, despite the fact that its hash matched a stored hash that is associated with secure data. The administrator may also choose to lock out the host or user that originated the blocked outbound secure data from accessing other secure data on the servers 130.

Figure 5:
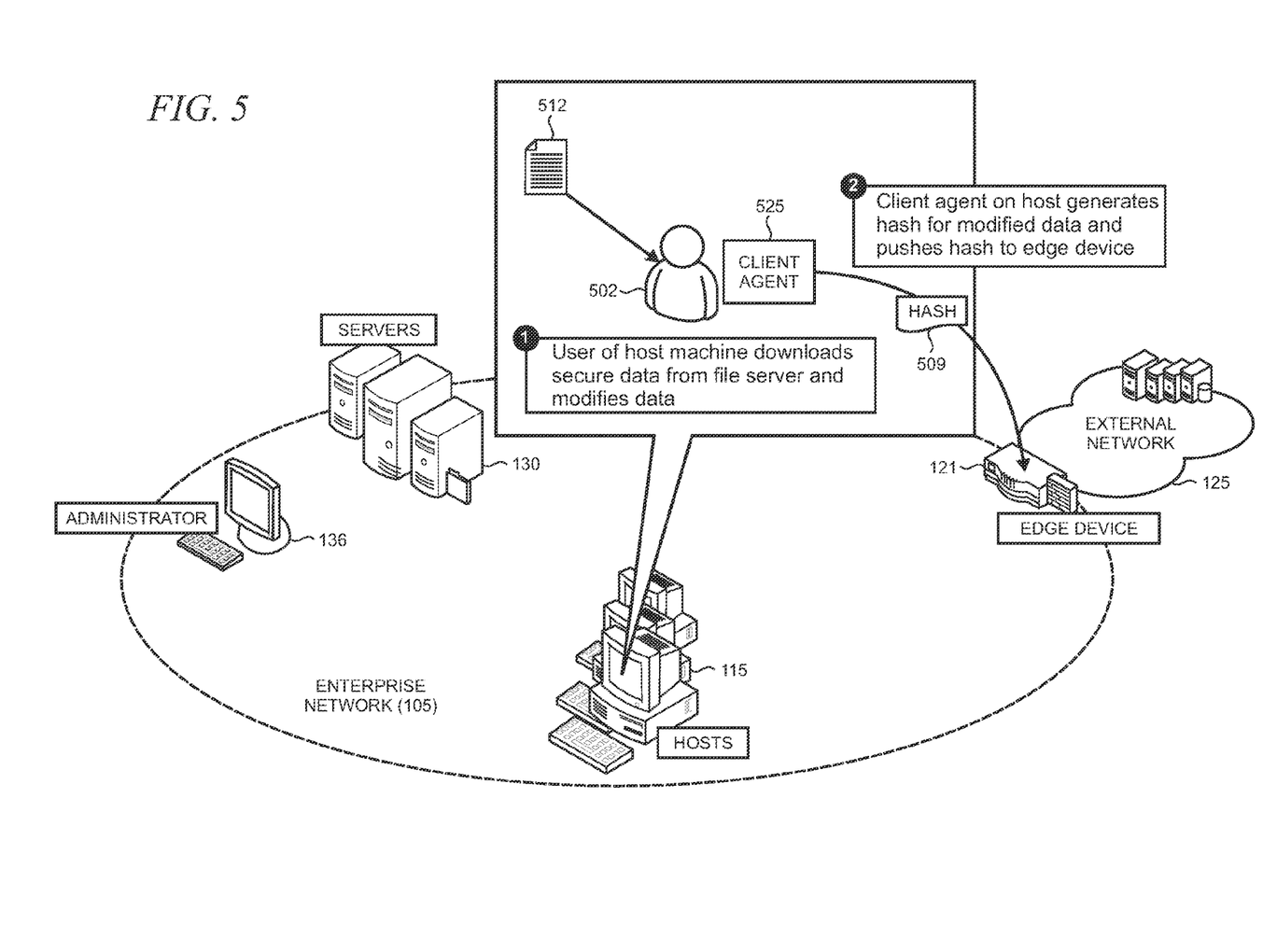
FIG. 5 shows an illustrative use scenario and activity flow for a client-side agent that operates host computers in which a hash for user-modified secure data is computed and pushed out to the edge device.

The present arrangement for preventing secure data from leaving a network perimeter may also be applied to data that gets modified by a user in the enterprise. Turning now to FIG. 5, an illustrative use scenario and activity flow is shown for a client-side agent that operates the host computers 115 in which a hash 509 is computed for secure data that is modified and pushed out to the edge device 121.

As indicated at (1), the use scenario entails a user 502 downloading secure data 512 to the user's local host machine 115 and then modifying the data. For example, the data 512 may comprise a word processing document that the user 502 modifies by editing the document (i.e., modifying text, adding new text, deleting existing text, etc.). In this example, because the modified document originated from secure data, it is assumed that it will maintain a secure designation. However, a hash computed for the modified data will not match a hash computed for the original secure data.

To effectively deal with this use scenario, as indicated at (2), a client-side agent 525 running on the host 115 is configured to track the downloading of secure data, as well as the occurrence of any subsequent modification to the secure data by the user of the host. The client-side agent 525 computes a hash 509 for the modified data and pushes it to the edge device 121 where it will be stored for future use. This enables the edge device 121 to stay updated with the latest information pertaining to secure data in the enterprise even as it is modified by users. Optionally, the client-side agent 525 may generate and send a notification to the admin console 136 whenever a user makes a modification to secure data and a new hash is computed.

The hashing process used by the client-side agent 525 is performed in a similar manner to the processes shown in FIGS. 2 and 4 and described in the accompanying text. It is also emphasized that all three hashing processes (i.e., those implemented, for example, at the servers 130, hosts 115, and edge device 121) must use the same hashing algorithm. Thus, while the admin console 136 may be configured to enable the administrator to select a particular hashing algorithm (as noted above), the selected algorithm will need to be used with all the hashing processes running in the enterprise environment.

Should a user subsequently attempt to send the modified data outside the enterprise network 105, then the edge device 121 can compute a hash for such outbound data, and then compare it against the stored hashes as shown in FIG. 4 and described in the accompanying text. In this case, as the hash computed for the outbound data will match a hash previously computed by the client agent 525, the edge device will block the outbound data from leaving the network perimeter because it will recognize that the outbound data is secure.

The client agent 525 is typically implemented as a software component that runs on each host 115 and integrated, for example, as part of a security product or application, or as functionality provided by the operating system. Alternatively, the client agent 525 may run on a separate platform and provide monitoring of one or more of the hosts 115 and computation of the hash for modified secure data on a remote basis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for preventing secure data from leaving a perimeter of an enterprise network, wherein an edge device couples the enterprise network to an external network, and the edge device has access to all traffic that flows inbound and outbound between the enterprise network and the external network, the method comprising the steps of:

computing a plurality of hashes for a data file to uniquely identify the data file as a secure data being subject to restrictions on leaving the enterprise network perimeter;

sending the plurality of hashes to the edge device;

storing the plurality of hashes at the edge device;

in response to a user of a host downloading the secure data from the enterprise network, a client agent running on a host machine, tracking any modification made to the secure data by the user;

when the secure data is modified by the user on the host machine, computing a hash for the modified secure data;

sending the hash for the modified secure data to the edge device;

monitoring, by the edge device, outbound data that is being sent out across the enterprise network;

computing, by the edge device, a hash of the outbound data;

comparing, by the edge device, the hash of the outbound data to each of the plurality of stored hashes, the stored hashes being associated with respective data files that are each designated by an administrator or authorized user of the enterprise network;

blocking, by the edge device, the outbound data from leaving the perimeter if the hash of the outbound data matches one of the stored hashes;

providing data from the edge device to the administrator or authorized user of the enterprise network, including an identity of secure data, an identity of who accessed the secure data, and when the secure data was accessed; and providing an indication, from the edge device to the administrator or authorized user of the enterprise network, of actions taken by the edge device in response to results of the comparing step.

2. The method of claim 1 in which the edge device is further configured to function as a gateway to an external network and the outbound data is intended to be received by an address on the external network.

3. The method of claim 2 in which the edge device is further configured to provide edge security including a firewall functionality, and network optimization selected from one of caching, HTTP compression, or QoS policy enforcement.

4. The method of claim 3 including the further steps of receiving a hash that is computed for data that is designated as secure, and storing the received hash with the plurality of stored hashes, the received hash functioning to uniquely identify the designated secure data.

5. The method of claim 4 in which the stored hashes are stored on a persistent basis in a repository that is disposed in an external device that is capable of being operatively coupled to the edge device.

6. The method of claim 5 including a further step of sending a notification to an administrator management function in the enterprise network when the outbound data is blocked from leaving the perimeter.

7. The method of claim 6 including a further step of receiving a manual override from a network administrator in response to the notification, the manual override indicating that the outbound data is permitted to leave the network perimeter.

8. The method of claim 7 in which the administrator management function includes features selected from one of configuration management, monitoring, reporting, or auditing.

9. The method of claim 8 in which the administrator management function is configured to enable selection among a plurality of different hashing algorithms.

10. A method for identifying data in an enterprise network as being secure, the method comprising the steps of:

receiving a designation from an administrator or authorized user of the enterprise network that a data file is secure data, wherein the administrator or authorized user of the enterprise network tracks the identity of the secure data, an identity of who accessed the secure data, and when the secure data was accessed;

computing a hash for the data file to uniquely identify the data file as secure data, the secure data being subject to restrictions on leaving the enterprise network perimeter;

in response to a user of a host downloading the secure data from the enterprise network, a client agent running on a host machine, tracking any modification made to the secure data by the user;

when the secure data is modified by the user on the host machine, computing a hash for the modified secure data;

sending the hash to an edge device that is positioned on the enterprise network perimeter, the edge device being arranged to block secure data that is outbound from the enterprise network;

storing the hash at the edge device, computing a hash of the outbound data;

comparing the hash of outbound data to stored hashes for the secure data;

blocking the outbound data from leaving the perimeter when the hash of the outbound data matches one of the stored hashes;

providing data from the edge device to the administrator or authorized user of the enterprise network, including an identity of secure data, an identity of who accessed the secure data, and when the secure data was accessed; and providing an indication, from the edge device to the administrator or authorized user of the enterprise network, of actions taken by the edge device in response to results of the comparing step.

11. The method of claim 10 including a further step of computing a hash for other data that is designated secure so that the edge device is kept updated with identities of currently secure data in the enterprise network.

12. The method of claim 11 in which the computing is performed at predetermined intervals.

13. The method of claim 12 including a further step of setting the predetermined intervals using an administrator console that is arranged to manage configuration of devices in the enterprise network.

14. A method for identifying data that has been modified at a host in an enterprise network as being secure, secure data being subject to restrictions on leaving the enterprise network perimeter, the method comprising the steps of:

monitoring, by a client agent, activity at the host to identity whether secure data that has been downloaded from a source in the enterprise network has been modified, wherein an edge device provides data to an administrator or authorized user of the enterprise network, including an identity of the secure data, an identity of who accessed the secure data, and when the secure data was accessed;

when the secure data is modified on the host, computing a hash for the modified secure data as being secure data;

sending, by a client agent, the hash to the edge device that is positioned on the enterprise network perimeter, the edge device being arranged to block secure data that is outbound from the enterprise network;
storing the hash at the edge device,
computing a hash of the outbound data;
comparing the hash of outbound data to stored hashes for the secure data;
blocking the outbound data from leaving the perimeter when the hash of the outbound data matches one of the stored hashes;
providing data from the edge device to the administrator or authorized user of the enterprise network, including an identity of secure data, an identity of who accessed the secure data, and when the secure data was accessed; and
wherein the edge device provides, to the administrator or authorized user of the enterprise network, actions taken by the edge device in response to results of the comparing step.

15. The method of claim 14 in which the edge device is selected from one of firewall, router, proxy server, switch, or gateway.

16. The method of claim 15 in which the host is a computing device being selected from one of desktop, laptop, or workstation, the computing device being coupled to the source, the source being a server.

17. The method of claim 16 in which the hash is computing using an algorithm selected from one of LM, MD4, MD5, CRC16, CRC32, SHA-0/1, SHA-0, SHA-1, SHA-2, Tiger, or RIPEMD.

18. The method of claim 17 in which the monitoring, computing, and sending are performed by a client-side agent disposed in a host machine in the enterprise network.

* * * * *